United States Patent [19]

Thiebault

[11] 3,828,590
[45] Aug. 13, 1974

[54] WHEEL CLAMP
[75] Inventor: Robert Thiebault, Paris, France
[73] Assignee: Prefecture De Police
[22] Filed: Jan. 27, 1972
[21] Appl. No.: 221,290

[52] U.S. Cl. .................................... 70/19, 70/225
[51] Int. Cl. ........................................ E05b 73/00
[58] Field of Search ......... 70/18, 19, 225, 259, 260, 70/226, 232; 280/297, 298, 289; 188/32

[56] References Cited
UNITED STATES PATENTS

| 577,673 | 2/1897 | Wickliffe | 70/18 |
| 1,524,086 | 1/1925 | Doble et al. | 70/232 X |
| 2,844,954 | 7/1958 | Marugg | 70/225 |
| 2,960,857 | 11/1960 | Winter | 70/19 |
| 3,317,006 | 5/1967 | Patterson | 188/32 |

FOREIGN PATENTS OR APPLICATIONS

| 507065 | 6/1920 | France | 70/18 |

Primary Examiner—James R. Boler
Assistant Examiner—Peter Nerbun
Attorney, Agent, or Firm—Robert E. Burns; Emmanuel J. Lobato; Bruce L. Adams

[57] ABSTRACT

A clamp for positively holding a motor vehicle, notably in case of infringement of traffic regulations, by gripping a wheel thereof, which comprises essentially a pair of inner and outer jaws formed with handle extensions and having an arm pivotally mounted to the outer jaw, for carrying the wheel hub covering means and prevent the removal of the wheel nuts, a screw-threaded rod pivoted to the outer jaw and engaged by a nut, an aperture in said arm and a slot extension of said diameter greater than said rod but smaller than said nut, whereby the arm can be tightened between said outer jaw and said nut when said arm is moved perpendicularly to said rod, and safety lock means pivotally mounted and adapted in their locked position to cover the aforesaid aperture and slot. (FIG. 2).

2 Claims, 2 Drawing Figures

PATENTED AUG 13 1974  3,828,590

WHEEL CLAMP

BACKGROUND OF THE INVENTION

1. Field of the Invention

This invention relates to a clamp for locking a wheel of a motor vehicle, which comprises essential two inner and outer jaws for clamping the wheel rim, which are pivotaly interconnected and urged by resilient means and held against movement by suitable locking means, an arm, concealing the means normally securing the wheel to the vehicle, and also the jaw locking means, said arm being rigidly attached through other locking means to the outer jaw of the device.

2. Description of the Prior Art

In certain cases, it appeared that an efficient method of holding a vehicle infringing the Highway Code or traffic regulations was the best solution for compelling the driver of the vehicle to reveal his identity and thus pay immediately a compromise penalty. In fact, in most instances the infringing driver is not present when the infringement is to be notified so that a relatively long time period elapses between the actual infringement and the issue of the corresponding legal action;

Wheel clamps are already known which comprises a pair of jaws urged by resilient means and adapted to be tightened at will on either side of the wheel rim. To prevent any subsequent removal of the jaws or the wheel proper, it is also known to use an arm secured at one end to the jaw support and at the other end to a member covering or concealing the wheel mounting means. This arm also comprises an aperture adapted to receive a latch bolt or like member rigid with the outer jaw which under these conditions is locked from outside by means of a padlock or the like.

However, this type of clamp is not entirely reliable for its relatively coarse locking means or the fastening of the aforesaid arm to the screen means can be tampered with. It is also possible to tamper with the locking means on the side opposite to said arm.

Another essential inconvenience is that this known clamp can hardly accommodate not only different rim widths without leaving any excessive clearance for the jaws, but also different wheel widths. Besides, this known device is rather unhandy.

SUMMARY OF THE INVENTION

The wheel clamp according to this invention is characterized in that it comprises a screw-threaded rod pivotally mounted to the outer jaw and engaged by a nut, an arm formed with an aperture of greater dimensions than said nut, said aperture being continued by a secant slot of a width greater than the diameter of said rod and smaller than the diameter of said nut, whereby the arm remains clamped between the outer jaw and said nut when it is moved perpendicularly to said rod.

This clamp is free of any external element likely to facilitate its removal, for in fact the arm is not secured to the element concealing the wheel mounting means, the closing means associated with one jaw are reinforced and the means for locking the jaws in position are capable of accomodating different rim thicknesses and wheel widths.

Moreover, this wheel clamp is definitely more handy than hitherto known structure due notably to the provision of jaw-control handles and also of pair of stands bearing on the ground.

DESCRIPTION OF THE DRAWING

A complete understanding of the invention may be obtained from the foregoing and following description thereof taken together with the appended drawing, wherein.

DESCRIPTION OF THE PREFERRED EMBODIMENT

Figure 2:
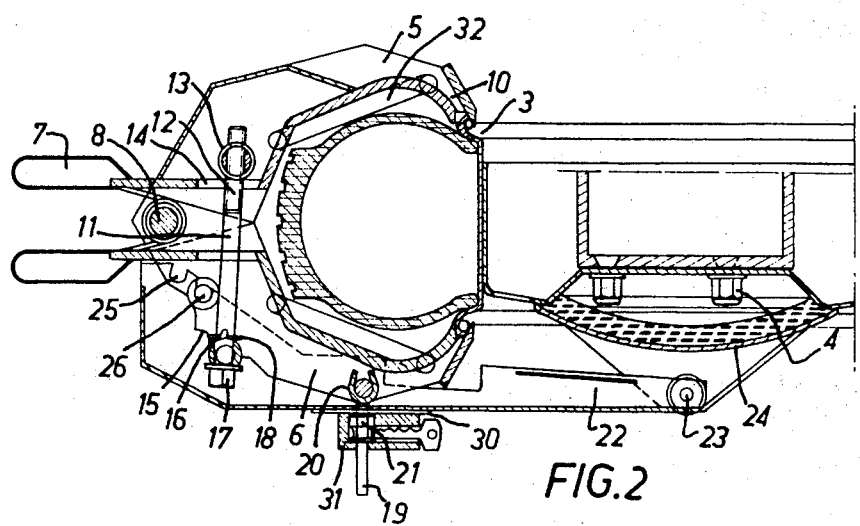
Figure 1:
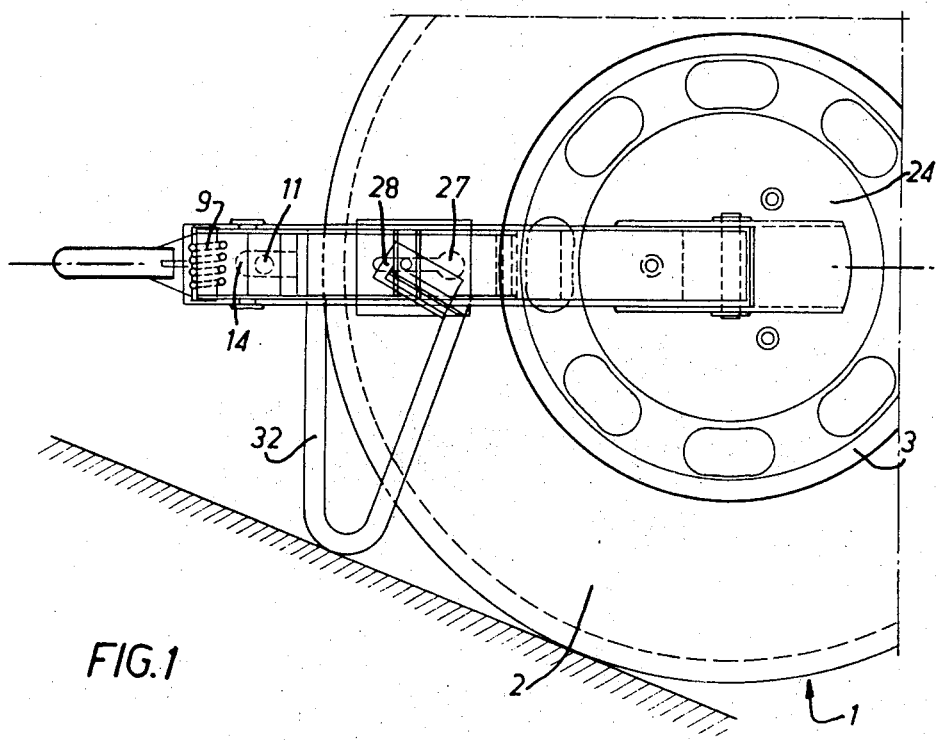
FIG. 1 is a side elevational view of the wheel clamp according to this invention, fitted to a wheel of a motor vehicle, and, FIG. 2 is an axial section taken along this axis II—II of FIG. 1.

The arrangement illustrated in the drawing comprises a wheel 1 of a motor vehicle which consists essentially of a tire 2 and a rim 3 secured through known means such as nuts 4 to the transmission shaft of the vehicle and covered by a nave cover plate. An inner jaw 5 and an outer jaw 6 fitted on either side of tire 2 are adapted to clamp like tongs on the wheel rim 3. These jaws are each rigid with a control handle 7 and pivoted to a pin 8 surrounded by a helical return spring 9 reacting with its ends against the inner face of handles 7 so as to constantly urge the clamp to its closed condition. The end 10 of each jaw 5, 6 is shaped to fit conveniently to the outermost edges of the rims 3 of all passenger cars and light delivery vans.

The means provided for locking the jaws 5 and 6 to the rim 3 comprise a rod 11 having a screw-threaded end portion 12 engaged by a nut 13 pivoting in the inner jaw 5 about an axis perpendicular to that of rod 11 as shown in the drawing. A pair of elongated apertures 14 formed for instance in members interconnecting the inner ends of handles 7 and jaws 5, 6 are engaged by said rod 11 and thus permit a certain variation in the angular position of said rod 11. Jaw 6 has formed in its outer edge a plurality of notches 15 adapted to keep the rod 11 in a given position according to the type and width of the rim to be clamped. This can be obtained for example by using a distance-piece or spacer 16 fitted freely on said rod 11 and retained thereon between its head 17 and a flat washer 18 locked by a split pin. The shape of this distance-piece is such that its ends can easily fit into the notches 15 formed in the two wings of the outer edge of jaw 6.

Another screw-threaded rod 19 adapted to pivot in the plane of FIG. 2 is mounted on this jaw 6 by means of a pivot pin 20 and engaged by a grooved nut 21.

A protection or guard arm 22 adapted to prevent the removal of the wheel mounting nuts 4 is provided and conceals the access to the device for locking the head of rod 11; to this end, the arm 22 is locked by means notably of the other rod 19 to the outer jaw 6. This arm 22 has pivotally mounted to one end, by means of a hinge 23 a screen 24 for concealing the wheel nuts 4. The screen 24 may consist for instance of a circular pressed sheet-metal element lined on its inner face with expanded or foam material and adapted to have a limited free motion. It bears directly on the wheel or the nave cover thereof. The other end of protection arm 22 has a plurality of notches 25 formed therein, of which one is adapted to engage a pin 26 carried by the outer jaw 6. The selection of the proper notch 25 will thus permit of adapting the arm to wheels of different diameter. The arm 22 has formed intermediate its ends an aperture 27 of a size somewhat larger than the diameter of nut 21, this aperture 27 having a lateral extension in the form of a slot 28 extending at right angles to the wheel axis, the width of said slot 28 being greater than the diameter of rod 19 and smaller than the diameter of nut 21, so that it can be used for tightening the arm 22 between the jaw 6 and said nut 21.

The means provided for locking the nut 21 in a tamper-proof manner comprises a locking unit 31 engageable by said nut and associated with a tumbler cylinder lock 29 and a small plate 30 secured to its upper portion for example by means of flat-head screws. The dimensions of this plate 30 are such that when the unit 31 is fitted in position, it conceals completely the aperture 27 and slot 28, thus preventing any access to or tampering with the nut 21 and to the tightening portion of said screw rod 19.

The wheel clamp described hereinabove is utilized as follows: it is firstly laid on the ground in front of the wheel of the vehicle to be secured against motion, the device bearing on its pair of stands 32 disposed on either side of the tire. Then, the jaws 5, 6 are opened and guided by means of the handles 7, care being taken to have the jaw ends 10 properly positioned on the rim 3. Then, the handles 7 are released and the locking means are tightened by rotating the head 17 and engaging the distance-piece 16 into a properly selected notch 15, so that the minimum play is obtained. Then the rod 19 is inserted with its nut 21 into the aperture 27 of arm 22. The arm assembly is slidably moved to the right (as seen in the Figures) in order to cause the rod 19 to engage the slot 28, the nut 21 remaining outside. This movement is continued until the screen 24 is properly located in relation to the wheel nuts 4 and the pin 26 engages one of the notches 25. It is also possible to centre the screen 24 directly and cause the rod 19 to pivot in its trunnion 20. The arm 22 is subsequently rigidly assembled with the device by tightening the grooved nut 21 and the latter is finally covered with the aforesaid locking unit 31. As the safety cylinder lock is rotated by means of the corresponding key a pin carried by this cylinder engages the groove of nut 21, thus definitely and positively locking the device in position.

What I claim is:

1. A clamp for holding a wheel of a vehicle against rotation when the vehicle is on a roadway comprising:

a. a pair of pivotally interconnected clamping jaws comprising an inner jaw and an outer jaw operable to an open position to receive the rim of a wheel to be gripped and to a clamping position to grip the rim, said jaws having a pair of opposed openings therethrough and said outer jaw having a plurality of notches disposed in an outer surface thereof, said jaws having handles extending therefrom and coactive therewith for operating said jaws to said open position, each of said jaws having a stand for resting on said roadway;
   b. means pivotally interconnecting said jaws;
   c. means biasing the jaws toward said clamping position;
   d. locking means for releasably locking the pair of jaws in said clamping position, said locking means comprising a bolt having a threaded end portion, a spacer complementary to said notches in said outer jaw and having a hole therethrough for receiving said bolt, and a nut for engaging said bolt and having a transverse dimension greater than said opening in said inner jaw, said locking means being disposed in use with said spacer disposed on said bolt adjacent an end remote from said threaded end portion extending through said openings in said jaws with said spacer inserted in one of said notches in said outer jaw and said nut on said threaded end portion of said bolt adjacent an outer surface of said inner jaw for preventing opening of said jaws;
   e. a guard arm removably mounted on said outer jaw at different longitudinal positions thereof and having means disposed rendering said locking means inaccessible when mounted on said outer jaw, said arm having fixed thereon a guard cover for covering the fastener members fastening said wheel to a respective wheel hub and precluding access to said fastener members;
   f. means on said guard arm and means on said outer jaw for mounting said guard arm on said outer jaw at different axially spaced positions for positioning said guard cover at different positions relative to said outer jaw thereby to accomodate for the covering of said fastener members of wheels of different overall diameters,
   g. and second locking means to releasably lock said guard arm on said outer jaw at said different positions said guard arm having an opening opposite said outer jaw therethrough, said opening through said guard arm having a major dimension in a longitudional direction of said guard arm, said second locking means comprising a threaded shaft, a pivot pin fixed to one end of said shaft and integral with said outer jaw at a point opposite said opening through said guard arm, a nut on said shaft, a plate having a major surface sufficiently large to cover said opening through said guard arm and having a hole for receiving said shaft therethrough, and a lock integral with said plate, said lock having means for releasably engaging said nut for preventing rotation thereof relative to said plate, said second locking means being disposed in use with said shaft extending through said opening in said guard arm, said plate inserted on said shaft and disposed adjacent a surface of said guard arm opposite said outer jaw and covering said opening therethrough, and said nut disposed on said shaft adjacent said plate and adjacent said means for engaging said nut for coacting therewith.

2. A clamp for holding a wheel of a vehicle against rotation when the vehicle is on a roadway according to claim 1, in which said means on said guard arm and means on said outer jaw for mounting said guard arm on said outer jaw at different axially spaced positions comprises a pin on said outer jaw and a portion of said guard arm having spaced notches receptive of said pin defining said different axially spaced positions.

* * * * *